United States Patent [19]

Tsukahara et al.

[11] Patent Number: 5,420,184
[45] Date of Patent: May 30, 1995

[54] THERMOPLASTIC RESIN COMPOSITION AND PROCESS FOR PREPARING THE SAME

[75] Inventors: Toru Tsukahara; Hiromi Nishimura; Yusuke Arashiro; Kiyoji Takagi; Koji Nishida, all of Yokkaichi, Japan

[73] Assignee: Mitsubishi Petrochemical Co., Ltd., Tokyo, Japan

[21] Appl. No.: 135,970

[22] Filed: Oct. 14, 1993

[30] Foreign Application Priority Data

Oct. 14, 1992 [JP] Japan .................. 4-276013
Jan. 28, 1993 [JP] Japan .................. 5-012729
Feb. 25, 1993 [JP] Japan .................. 5-036704

[51] Int. Cl.⁶ .................................. C08K 5/527
[52] U.S. Cl. .................. 524/120; 524/117; 524/399; 524/400
[58] Field of Search ........... 524/117, 120, 399, 400; 525/396, 397

[56] References Cited

U.S. PATENT DOCUMENTS

| | | | |
|---|---|---|---|
| 4,309,335 | 1/1982 | Akutsu et al. | 524/151 |
| 4,405,739 | 9/1983 | Kinson | 524/151 |
| 4,618,633 | 10/1986 | Taubitz et al. | 524/119 |
| 4,672,086 | 6/1987 | Seiler et al. | 524/127 |
| 4,935,472 | 6/1990 | Brown et al. | 525/397 |
| 4,968,749 | 11/1990 | Shibuya et al. | |
| 5,001,181 | 3/1991 | Takagi et al. | |
| 5,023,285 | 6/1991 | Horn | 524/120 |
| 5,026,787 | 6/1991 | Takagi et al. | |
| 5,041,504 | 8/1991 | Brown et al. | 525/397 |
| 5,049,603 | 9/1991 | Mochizuki | 524/140 |
| 5,073,596 | 12/1991 | Inoue et al. | |
| 5,091,473 | 2/1992 | Arashiro et al. | |
| 5,124,411 | 6/1992 | Tang et al. | 525/397 |
| 5,159,008 | 10/1992 | Nishida et al. | |
| 5,202,409 | 4/1993 | Tsukahara et al. | |
| 5,226,673 | 7/1993 | Cech | |

FOREIGN PATENT DOCUMENTS 0186011 7/1986 European Pat. Off. .
0386256 9/1990 European Pat. Off. .
WO91/08250 6/1991 WIPO .

*Primary Examiner*—Veronica P. Hoke
*Attorney, Agent, or Firm*—Oblon, Spivak, McClelland, Maier, & Neustadt

[57] ABSTRACT

Disclosed are a thermoplastic resin composition which comprises
(A) 10 to 90% by weight of a polyphenylene ether,
(B) 90 to 10% by weight of a saturated polyester,
(C) 0.1 to 10 parts by weight of an organic phosphorous acid compound represented by the formula:

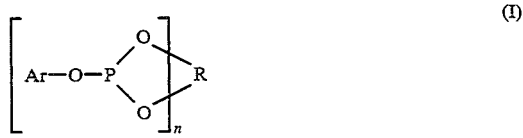

(I)

wherein n represents 1 or 2; Ar represents an aryl group having 6 to 30 carbon atoms or a substituted aryl group and when n is 2, Ars may be the same or different; and R represents an alkylene group having 2 to 18 carbon atoms or arylene group when n is 1 and represents an alkanetetrayl group having 4 to 18 carbon atoms when n is 2, based on 100 parts by weight of Components (A) and (B) , and
(D) 0 to 10 parts by weight of an acid receptor based on 100 parts by weight of Components (A) and (B),
and a process for preparing the same.

8 Claims, No Drawings

THERMOPLASTIC RESIN COMPOSITION AND PROCESS FOR PREPARING THE SAME

BACKGROUND OF THE INVENTION

This invention relates to a thermoplastic resin composition comprising a polyphenylene ether (hereinafter referred to as "PPE"), a saturated polyester, an organic phosphorous acid compound and, if necessary, an acid acceptor and having excellent mechanical strength, and a process for preparing the same. The above composition is an engineering plastics useful as a connector, an ignition manifold, a coil-sealing material, a gear and a crank shaft and also as an industrial material such as parts for automobiles and parts for electric equipments having excellent solvent resistance and heat resistance.

PPE has been used as an engineering plastics having excellent heat resistance, dimensional stability, nonhygroscopicity and electric characteristics. However, it has drawbacks that melt fluidity (flowability when melting) is bad to make molding processing such as injection molding and extrusion molding difficult, and also a molded product thereof has poor solvent resistance and impact resistance.

On the other hand, a saturated polyester represented by polybutylene terephthalate has been used widely as an engineering plastics having excellent molding processability, solvent resistance and mechanical strength in the fields of parts for automobiles and parts for electric and electronic equipments. However, a molded product of the above resin has drawbacks that molding shrinkage rate and linear expansion coefficient are high, and also rigidity is greatly lowered at high temperature.

If a composition having both good properties of PPE and the saturated polyester and compensating undesirable properties each other can be obtained, an excellent resin material having a wide application field can be provided, and it can be said that industrial significance of such a material is extremely great.

Compositions in which both resins are simply melted and mixed have been described in, for example, Japanese Patent Publication No. 21664/1976 and Japanese Provisional Patent Publications No. 75662/1974 and No. 159847/1984. However, in such a simple blend system, PPE and the saturated polyester have poor compatibility with each other so that a composition can hardly have a uniform and fine mixed state. As a result, even when such a composition is used, impact resistance, heat resistance, dimensional precision and solvent resistance of a molded product thereof cannot be improved satisfactorily, and appearance of a molded product is worsened.

It has been generally known that the compatibility can be improved by adding a block and/or graft copolymer comprising PPE and the saturated polyester to a composition. The block and/or graft copolymer can be prepared by PPE and a saturated polyester both having polyfunctional groups which react with and bond to each other. It has been known that as the polyfunctional group, PPE has a phenolic hydroxyl group represented by the formula (a):

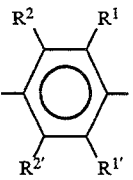

wherein $R^1$ and $R^{1\prime}$ each represent a halogen atom, a primary or secondary alkyl group, an aryl group, an aminoalkyl group, a halohydrocarbon group, a hydrocarbonoxy group or halohydrocarbonoxy group; and $R^2$ and $R^{2\prime}$ each represent a hydrogen atom, a halogen atom, a primary or secondary alkyl group, an aryl group, a halohydrocarbon group, a hydrocarbonoxy group or a halohydrocarbonoxy group, or the formula (b):

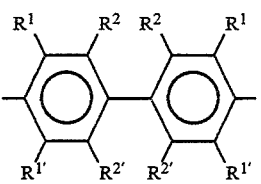

wherein $R^1$, $R^{1\prime}$, $R^2$ and $R^{2\prime}$ have the same meanings as defined above, at a molecular end thereof.

On the other hand, it has been known that the saturated polyester has an ester structure as a matter of course or a carboxylate group at a molecular end thereof.

In general, bonding reaction of the above phenolic hydroxyl group and carboxylic acid, i.e. direct esterification is not easily carried out so that various aids for activating the reaction and other means have been developed.

There has been conventionally known a method of using triphenyl phosphite as an aid for direct esterification of a phenolic hydroxyl group and carboxylic acid (Yamazaki and Higashi, "Advances in Polymer Science", 38, 1 (1981)). It is considered that a block copolymer of PPE and a saturated polyester can be obtained by applying the above reaction to a phenolic hydroxyl group at the end of a molecular chain of PPE and a carboxyl group at the end of a molecular chain of a saturated polyester.

In U.S. Pat. No. 4,672,086, it has been described that 5 to 15 % by weight of a phosphor compound (including a phosphorous acid compound) is added to a composition of PPE and a polyester for the purpose of imparting flame retardancy. However, even when tris(-nonylphenyl) phosphite described therein is used, a composition having improved compatibility and good physical properties cannot be obtained.

In PCT Provisional Patent Publication No. WO 91/08250 (which corresponds to U.S. Pat. No. 5,124,411), there has been disclosed a method for preparing a graft or block copolymer comprising PPE and a polyester, using an extremely common phosphorous acid compound having a $P(OR)_3$ structure such as triphenyl phosphite. In the above method, it is an essential requirement that a phosphorous acid compound decomposed by reaction or side reaction and an unreacted phosphorous acid compound are removed in order to accelerate reaction. However, physical properties such as impact resistance of the resulting composition are not satisfactory. It is considered that this is because reaction activity as an ester condensation agent is not sufficient so that an amount of a formed block and/or graft copolymer is small and compatibility is not improved sufficiently.

SUMMARY OF THE INVENTION

An object of the present invention is to provide a thermo-plastic resin composition in which compatibility of PPE and a saturated polyester is improved, and mechanical strength, heat resistance, solvent resistance and appearance of a molded product are excellent, and a process for preparing the same.

The present inventors have studied intensively in order to solve the above problems and found that a thermoplastic resin composition comprising PPE and a saturated polyester having excellent physical properties can be prepared by using a specific organic phosphorous acid compound which is an excellent compatibilizer of PPE and a saturated polyester and, if necessary, an acid receptor, and by kneading the above components in the presence of a compound having a boiling point of 35° C. to 300° C. at normal pressure and removing a part or all of at least one of an amine compound derived from PPE and a hydroxy compound derived from the specific organic phosphorous acid compound, to accomplish the present invention.

The first invention is concerned with a thermoplastic resin composition which comprises (A) 10 to 90% by weight of a polyphenylene ether,
(B) 90 to 10% by weight of a saturated polyester,
(C) 0.1 to 10 parts by weight of an organic phosphorous acid compound represented by the formula:

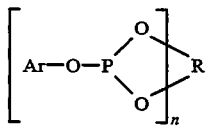

(I)

wherein n represents 1 or 2; Ar represents an aryl group having 6 to 30 carbon atoms or a substituted aryl group and when n is 2, Ars may be the same or different; and when n is 1, R represents an alkylene group having 2 to 18 carbon atoms or arylene group and when n is 2, R represents an alkanetetrayl group having 4 to 18 carbon atoms, based on 100 parts by weight of Components (A) and (B), and (D) 0 to 10 parts by weight of an acid receptor based on 100 parts by weight of Components (A) and (B)

The second invention is concerned with a process for preparing the composition described above by melting and kneading Components (A), (B), (C) and (D), which comprises removing a part or all of at least one of an amine compound derived from Component (A) and a hydroxy compound derived from Component (C).

The third invention is concerned with a process for preparing the composition described above, which comprises melting and kneading Components (A), (B), (C) and (D) in the presence of a compound having a boiling point of 35° C. to 300° C. at normal pressure.

DESCRIPTION OF THE PREFERRED EMBODIMENTS

In the following, the present invention is explained in detail.

The reason for excellent compatibility of PPE (A) and the saturated polyester (B) which is realized in the present invention is estimated as described below, but the present invention is not limited by any theory.

The compatibility of the present invention is considered to be brought about directly by a block copolymer of PPE and a saturated polyester, represented by the formula:

$$X-OCO-Y$$

wherein X represents a PPE residue; and Y represents a saturated polyester residue, formed by the following reaction formula (II):

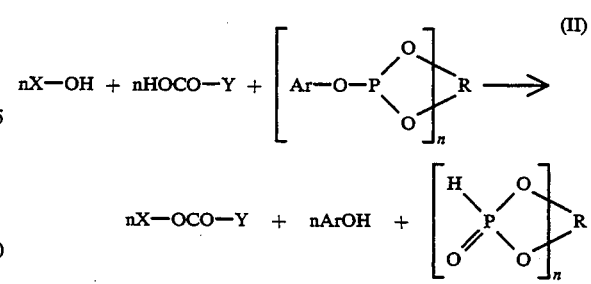

(II)

wherein X, Y, Ar, R and n have the same meanings as defined above.

As to the reaction (II), the following merit may be considered.

Merit of using the organic phosphorous acid compound (C) of the formula (I)

In the present invention, the organic phosphorous acid compound (C) with a structure having both a chelate substituent and an aryl substituent, represented by the formula (I) is used. It is estimated that the above compound controls an electronic state and a stereoregular state around a phosphor atom in favor of the reaction (II) so that high reactivity can be exhibited in the reaction (II) described above (Yamazaki and Higashi, "Advances in Polymer Science", 38, 1 (1981)) .

<PPE (A)>

PPE (A) to be used in the present invention is a homopolymer or copolymer having a structural unit represented by the formula (III):

(III)

wherein $R^1$, $R^{1'}$, $R^2$ and $R^{2'}$ have the same meanings as defined above As a preferred example of the primary alkyl group represented by $R^1$ $R^{1'}$, $R^2$ or $R^{2'}$, there may be mentioned methyl, ethyl, n-propyl, n-butyl, n-amyl, iso-amyl, 2-methylbutyl, 2,3-dimethylbutyl, 2-, 3- or 4-methylpentyl or heptyl. As a preferred example of the secondary alkyl group, there may be mentioned isopropyl, sec-butyl or 1-ethylpropyl. In many cases, $R^1$ or $R^{1'}$ is an alkyl group or a phenyl group, particularly an alkyl group having 1 to 4 carbon atoms, and $R^2$ or $R^{2'}$ is a hydrogen atom.

Specific examples of PPE (A) may include poly(2,6-dimethyl-1,4-phenylene ether), poly (2,6-diethyl-1,4-phenylene ether), poly (2,6-dipropyl-1,4-phenylene ether), poly(2-ethyl-6-methyl-1,4-phenylene ether), poly(2-methyl-6-propyl-1,4-phenylene ether), a 2,6-dimethylphenol/2,3,6-trimethylphenol copolymer, a 2,6-dimethylphenol/2,3,6-triethylphenol copolymer, a 2,6-diethylphenol/2,3,6-trimethylphenol copolymer, a 2,6-dipropylphenol/2,3,6-trimethylphenol copolymer, a graft copolymer obtained by subjecting poly(2,6-dimethyl-1,4-phenylene ether) and styrene to graft polymerization and a graft copolymer obtained by subjecting a 2,6-dimethylphenol/2,3,6-trimethylphenol copolymer and styrene to graft polymerization.

As a preferred homopolymer of PPE (A), there may be mentioned, for example, poly(2,6-dimethyl-1,4-phenylene ether). As a preferred copolymer, there may be mentioned a random copolymer of 2,6-dimethylphenol and 2,3,6-trimethylphenol.

PPE (A) preferably has an intrinsic viscosity measured at 30° C. in chloroform of about 0.2 to 0.8 dl/g and a number average polymerization degree of 25 to 400.

PPE (A) can be prepared generally by oxidation coupling reaction of a phenol compound. There have been known a number of catalysts used in the oxidation coupling reaction of PPE. The catalyst to be used is not particularly limited and may be any known catalyst. There may be mentioned, for example, a catalyst containing at least one compound of a heavy metal such as copper, manganese and cobalt in combination of various other substances (e.g. U.S. Pat. Nos. 4,042,056, 3,306,874, 3,306,875, 3,365,422, 3,639,656, 3,642,699, 3,733,299, 3,838,102, 3,661,848 and 5,037,943).

PPE (A) contains amino type nitrogen. The amino type nitrogen is derived from an amino compound used as a catalyst, a cocatalyst or an aid during polymerization of PPE. The amino compound is mixed in PPE as a polymerization residue or bonded to PPE molecules.

PPE (A) contains molecules with a terminal structure represented by the formula (IV):

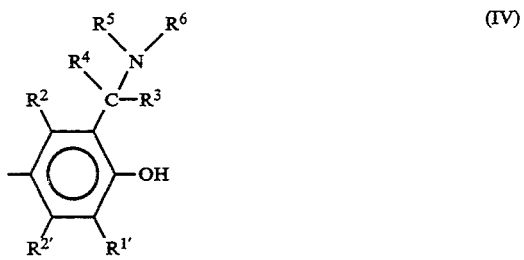

wherein $R^{1'}$, $R^2$ and $R^{2'}$ have the same meanings as defined above; and $R^3$, $R^4$, $R^5$ and $R^6$ each represent a hydrogen atom, a primary or secondary alkyl group or an aryl group.

PPE (A) containing molecules with the terminal structure of the formula (VI) can be obtained by using a manganese- or copper-containing catalyst in combination with a primary or secondary amine during polymerization. Specific examples of the amine may include diethylamine, dipropylamine, dibutylamine, diheptylamine, N-ethylaniline and N-methylaniline. In many cases, dibutylamine is used.

In the present invention, PPE containing 40% by weight or more of molecules having the terminal structure of the formula (IV) is preferred.

The PPE having an amino type nitrogen preferably has the specific viscosity of 0.2 to 0.8 dl/g and the number average molecular weight (Mn) of 25 to 400.

The ratio of the amino type nitrogen to be contained in PPE (A) to be used in the present invention is preferably 500 ppm or more, more preferably 650 ppm or more in order to further improve the impact resistance of the composition comprising PPE and the saturated polyester.

Here, as PPE (A), there may be used a powdery polymer obtained by the above polymerization directly or pellets obtained by pelletizing the powdery polymer by a granulator, but most of the amino type nitrogen is lost when the powdery polymer is melted in a granulator so that the powdery polymer obtained by the above polymerization is preferably used.

When the content of the amino type nitrogen in PPE (A) to be used is insufficient, it can be replenished by adding a nitrogen-containing compound such as pyridine or a substituted pyridine and a secondary or tertiary amine. The nitrogen-containing compound should be added so that the content of the amino type nitrogen in PPE (A) is 500 ppm or more.

In PPE components after a thermoplastic resin composition is prepared, any amount of the amino type nitrogen may be contained.

A merit of using PPE (A) containing a specific amount or more of amino type nitrogen can De considered as follows.

PPE preferably contains molecules having an amino group at an end thereof. That is, PPE has amino groups which become a reaction aid of the reaction (II) in the vicinity of a reaction site of PPE and the saturated polyester so that reaction activity can be extremely improved.

As PPE (A) of the present invention, there may be preferably used a modified PPE (A) having a functional group which reacts with an ester group, a carboxyl group or an alcoholic hydroxyl group.

As the functional group which reacts with an ester group, a carboxyl group or an alcoholic hydroxyl group, there may be mentioned, for example, an alcoholic hydroxyl group, an epoxy group, a carboxyl group, an acid anhydride, an ester, an acid halide, an amino group, an amide group, an oxazoline group, a phosphate group and a phosphite group.

As a preferred modified PPE (A) having a functional group which reacts with an ester group, a carboxyl group or an alcoholic hydroxyl group of the present invention, there may be mentioned PPE having an alcoholic hydroxyl group, PPE having an epoxy group and PPE having an acid anhydride group. As these PPE having an alcoholic hydroxyl group, PPE having an epoxy group and PPE having an acid anhydride group, there may be used known ones, and structures and preparation methods thereof are not particularly limited.

For example, the PPE having an alcoholic hydroxyl group may be exemplified by the following ①  to ③, PPE having an epoxy group may be exemplified by the following ④ to ⑥ and PPE having an acid anhydride group may be exemplified by the following ⑦ and ⑧, respectively.

① PPE modified by a compound having both of an alcoholic hydroxyl group and an ethylenic double bond The compound may be produced by the method in which the compound having both of an alcoholic hydroxyl group and an ethylenic double bond and PPE are mixed with each other, and then, subjecting to a melting and kneading reaction at a temperature of 150° to 320° C. by using, for example, a roll mill, a Banbury mixer and an extruder, or the method in which, for example, the compound having both of an alcoholic hydroxyl group and an ethylenic double bond and an unmodified PPE are heated and reacted in a solvent such as benzene, toluene, xylene and chlorobenzene.

As the compound having both of an alcoholic hydroxyl group and an ethylenic double bond, where may be mentioned, for example, 2-hydroxyethyl acrylate, 2-hydroxyethyl methacrylate, 2-hydroxypropyl acrylate, 2-hydroxypropyl methacrylate, 1,4-butanediol monoacrylate, 1,4-butanediol monomethacrylate, bis(1,4-butanediol) maleate, 1,6-hexanediol monoacrylate, 1,6-hexanediol monomethacrylate, trimethylolpropane monoacrylate, trimethylolpropane monomethacrylate, pentaerythritol monoacrylate, pentaerythritol monomethacrylate and allyl alcohol. Of these compounds, 2-hydroxyethyl methacrylate is particularly preferred.

The amount of the compound having both of an alcoholic hydroxyl group and an ethylenic double bond is 0.01 to 20% by weight, preferably 0.1 to 10% by weight based on the amount of the PPE.

To accelerate the modification reaction, it is effective to add a radical initiator represented by an organic peroxide such as t-butyl hydroperoxide, cumene hydroperoxide, t-butyl hydroperoxide, dicumyl peroxide, benzoyl peroxide, m-toluyl peroxide, diisopropyl peroxydicarbonate, t-butyl peroxybenzoate and di-t-butyl peroxide; and an azo compound such as 2,2'-azobisisobutyronitrile and 2,2'-azobisisovaleronitrile, to the reaction system.

② modified PPE in which the phenolic hydroxyl groups at the end of the molecule are converted into alcoholic hydroxyl groups by a functionalizing agent The following a) to e) may be exemplified.
a) An alcoholic hydroxyl group-modified PPE using a glycidol as a functionalizing agent (as disclosed in Japanese Provisional Patent Publication No. 250025/1991)
b) An alcoholic hydroxyl group-modified PPE in which epihalohydrin is used as a functionalizing agent and the resulting terminal glycidyl PPE is hydrolized (as disclosed in Japanese Provisional Patent Publication No. 250025/1991)
c) An alcoholic hydroxyl group-modified PPE using a halogenated alkyl alcohol as a functionalizing agent (as disclosed in Japanese Provisional Patent Publication No. 292326/1991)
d) An alcoholic hydroxyl group-modified PPE using an alkylene carbonate as a functionalizing agent (as disclosed in Japanese Provisional Patent Publication No. 250027/1991)
e) An alcoholic hydroxyl group-modified PPE using a 1,2-alkylene oxide as a functionalizing agent (as disclosed in Japanese Provisional Patent Publication No. 128021/1989)

③ modified PPE having an alcoholic hydroxyl group in the molecular chain (as disclosed in Japanese Provisional Patent Publications No. 202223/1992 and No. 325045/1991)

The alcoholic hydroxyl group-modified PPE may be produced by the method in which a compound having both of a thiol group and a hydroxyl group is reacted with PPE containing a unit having a carbon-carbon unsaturated bond as a substituent (as disclosed in Japanese Provisional Patent Publication No. 103629/1992) or the method in which a boran compound is reacted with the same (as disclosed in Japanese Provisional Patent Publication No. 20524/1992). It is also possible to produce the compound by reacting ethylene oxide with PPE metallated by an alkali metal as disclosed in Japanese Provisional Patent Publication No. 107634/1990.

The alcoholic hydroxyl group-modified PPE may be either a random copolymer or a block copolymer.

④ PPE modified by a compound having both of an epoxy group and an ethylenic double bond The modified PPE may be produced by the method in which the compound having both of an epoxy group and an ethylenic double bond and PPE are mixed with each other, and then, subjecting to a melting and kneading reaction at a temperature of 150° to 320° C. by using, for example, a roll mill, a Bunbary mixer and an extruder, or the method in which, for example, the compound having both of an epoxy group and an ethylenic double bond and PPE are heated and reacted in a solvent such as benzene, toluene, xylene and chlorobenzene.

As the compound having both of an epoxy group and an ethylenic double bond, there may be mentioned, for example, a glycidyl ester of an unsaturated dicarboxylic acid such as maleic acid, fumaric acid, chloromaleic acid, citraconic acid, itaconic acid and 3- or 4-vinylphthalic acid; a glycidyl ester of an unsaturated monocarboxylic acid such as acrylic acid, crotonic acid, vinylacetic acid, methacrylic acid, pentenoic acid, o-, m- or p-vinylbenzoic acid and undecenic acid; an acrylamide derivative such as N-[4(2,3-epoxypropoxy) -3,5-dimethylbenzyl]acrylamide, N-[4(2,3-epoxypropoxy) -3-methylbenzyl]acrylamide and N-[4-(2,3epoxypropoxy)-benzyl]acrylamide; 3,4-epoxycyclohexylmethyl methacrylate and N-[4-(2,3-epoxy)propoxy]phenyl maleimide. Of these compounds, preferred are glycidyl methacrylate and N-[4-(2,3-epoxypropoxy)-3,5-dimethylbenzyl]acrylamide, and more preferred is N- [4-(2,3-epoxypropoxy)-3,5-dimethylbenzyl]acrylamide.

The amount of the compound having both of an epoxy group and an ethylenic double bond is 0.01 to 20% by weight, preferably 0.1 to 10% by weight based on the amount of the PPE.

To accelerate the modification reaction, it is effective to add a radical initiator represented by an organic peroxide such as t-butyl hydroperoxide, cumene hydroperoxide, t-butyl hydroperoxide, dicumyl peroxide, benzoyl peroxide, m-toluyl peroxide, diisopropyl peroxydicarbonate, t-butyl peroxybenzoate and di-t-butyl peroxide; and an azo compound such as 2,2'-azobisisobutyronitrile and 2,2'-azobisisovaleronitrile, to the reaction system.

⑤ Terminal glycidyl PPE shown in the above ② b)
⑥ Epoxy group-modified PPE obtained by reacting epihalohydrin to a metallated PPE by an alkali metal
⑦ PPE modified by a compound having both of an acid anhydride group and an ethylenic double bond The modified PPE may be produced by the method in which the compound having both of an acid anhydride group and an ethylenic double bond and PPE are mixed with each other, and then, subjecting to a melting and kneading reaction at a temperature of 150° to 320° C. by using, for example, a roll mill, a Bunbary mixer and an extruder, or the method in which, for example, the compound having both of an acid anhydride group and an ethylenic double bond and the above PPE are heated and reacted in a solvent such as benzene, toluene, xylene and chlorobenzene.

As the compound having both of an acid anhydride group and an ethylenic double bond, there may be mentioned, for example, an acid anhydride of an unsaturated dicarboxylic acid such as maleic acid, fumaric acid, chloromaleic acid, citraconic acid, itaconic acid and 3- or 4-vinylphthalic acid. Of these compounds, preferred are maleic anhydride and itaconic anhydride, and more preferred is maleic anhydride.

The amount of the compound having both of an epoxy group and an ethylenic double bond is 0.01 to 20% by weight, preferably 0.1 to 10% by weight based on the amount of the PPE.

To accelerate the modification reaction, it is effective to add a radical initiator represented by an organic peroxide such as t-butyl hydroperoxide, cumene hydroperoxide, t-butyl hydroperoxide, dicumyl peroxide, benzoyl peroxide, m-toluyl peroxide, diisopropyl peroxydicarbonate, t-butyl peroxybenzoate and di-t-butyl peroxide; and an azo compound such as 2,2'-azobisisobutyronitrile and 2,2'-azobisisovaleronitrile, to the reaction system.

(8) PPE modified by reacting a compound having both of an acid halide group and an acid anhydride group or a compound having two or more acid anhydride groups to the phenolic hydroxyl groups at the end of the PPE molecule (as disclosed in Japanese Provisional PCT Patent Publication No. 500456/1987 and Japanese Provisional Patent Publication No. 199754/1988).

In the process of the present invention, it is preferred to remove part or whole part of an amine compound derived from PPE (A) as explained below during the reaction and/or after completion of the reaction.

<Amine compound derived from PPE (A)>

The amine compound derived from PPE (A) is a volatile compound derived from amines used during polymerization of PPE. The above amine compound is mixed in PPE (A) or bonded to the end of the molecule of PPE (A). The above amines are vaporized from or decomposed and liberated from PPE (A) by heating. It is estimated that the amines are vaporized or decomposed and liberated from PPE (A) according to, for example, the following reaction scheme (V) regarding the end of the molecule of PPE (A):

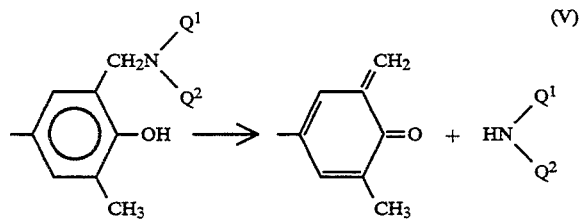

wherein $Q^1$ and $Q^2$ each represent a hydrogen atom, an alkyl group or an aromatic group.

In many cases, the amine compound derived from PPE (A) is a secondary amine such as dibutylamine.

<Saturated polyester (B)>

As the saturated polyester (B) to be used in the present invention, various polyesters can be used.

As one example thereof, there may be mentioned a thermoplastic polyester prepared by condensing (1) a dicarboxylic acid (including an aliphatic or aromatic dicarboxylic acid), a lower alkyl ester thereof, an acid halide or an acid anhydride derivative and (2) a dihydroxy compound (i.e., an aliphatic diol or an aromatic diol) according to a conventional method.

As a specific example of the aliphatic or aromatic dicarboxylic acid and acid chlorides thereof suitable for preparing the above polyester, there may be mentioned oxalic acid, malonic acid, succinic acid, glutaric acid, adipic acid, suberic acid, azelaic acid, sebacic acid, terephthalic acid, isophthalic acid, phthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid or 2,7-naphthalenedicarboxylic acid and acid chlorides thereof, or a mixture of these carboxylic acids, and also a mixture of acid chlorides thereof. The lower alkyl ester of the above dicarboxylic acid may include an alkyl ester having 1 to 4 carbon atoms such as a methyl ester, an ethyl ester, a propyl ester and a butyl ester. As examples thereof, there may be mentioned dimethyl terephthalate, dimethyl isophthalate, diethyl terephthalate, diethyl isophthalate, dimethyl-2,6-naphthalene dicarboxylate, dimethyl adipate, bis($\beta$-hydroxyethyl)terephthalate or a mixture of these lower alkyl esters.

As a specific example of the acid anhydride derivative, there may be mentioned, for example, an acid anhydride of an unsaturated dicarboxylic acid such as maleic acid, fumaric acid, chloromaleic acid, citraconic acid, itaconic acid and 3- or 4-vinylphthalic acid.

As the aliphatic diol suitable for preparing the saturated polyester (B), there may be mentioned a straight alkylene glycol having 2 to 12 carbon atoms, for example, ethylene glycol, 1,3-propanediol, 1,4-butanediol, 1,6-hexanediol and 1,12-dodecanediol. As the aromatic diol, there may be mentioned p-xylylene glycol, pyrocatechol, resorcinol, hydroquinone or alkyl-substituted derivatives of these compounds. Other suitable diols may include 1,4-cyclohexanedimethanol.

As the other preferred saturated polyester (B), there may be mentioned a polyester obtained by ring opening polymerization of a lactone, for example, polypivalolactone and poly($\epsilon$-caprolactone). Further, as other preferred saturated polyester (B), there may be mentioned a thermotropic liquid crystal polymer (TLCP) which forms liquid crystal in a melted state. As a representative TLCP which is commercially available, there may be mentioned X7G (trade name) produced by Eastman Kodak Co., Xydar (trade name) produced by Datoco Co., Ekonol (trade name) produced by Sumitomo Kagaku Co. and Vectra (trade name) produced by HoechstCelanese Co.

Among the saturated polyesters (B) described above, polyethylene terephthalate (PET), polybutylene terephthalate (PBT), polyethylene naphthalate (PEN), polybutylene naphthalate (PBN), poly(1,4-cyclohexanedimethyl terephthalate (PCT) and a liquid crystal polyester are the saturated polyesters (B) preferably used in the thermoplastic resin composition of the present invention.

The saturated polyester preferably has an intrinsic viscosity measured at 30° C. in phenol/tetrachloroethane (60/40 volume ratio) of about 0.2 to 10 dl/g and a number average molecular weight (Mn) of 25 to 400.

<Organic phosphorous acid compound (C)>

The organic phosphorous acid compound (C) to be used in the present invention is a specific organic phosphorous acid compound in which heat stability is excellent and electronic state and stereoregular state around a phosphor atom are controlled by a structure having both a chelate substituent and an aryl substituent, represented by the formula (I):

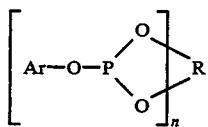
(I)

wherein Ar, R and n have the same meanings as defined above.

Here, as a specific example of Ar, there may be mentioned a phenyl group; a substituted phenyl group such as 2-, 3- or 4-methylphenyl, 2,4- or 2,6-dimethylphenyl, 2,4,6-trimethylphenyl, 2-, 3- or 4-ethylphenyl, 2,4- or 2,6-diethylphenyl, 2,4,6-triethylphenyl, 2-, 3- or 4-tert-butylphenyl, 2,4 - or 2,6-di-tert-butylphenyl, 2,4,6-tri-tert-butylphenyl, 2,6-di-tert-butyl-4-methylphenyl, 2,6-di-tert-butyl-4-ethylphenyl, 2-, 3- or 4-nonylphenyl and biphenyl; and a naphthyl group.

As a specific example of R, there may be mentioned a 1,2-phenylene group; and a polymethylene group such as ethylene, propylene, trimethylene, tetramethylene and hexamethylene when n is 1, and a tetrayl group derived from pentaerythritol, represented by the formula (VI):

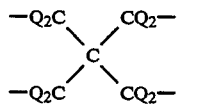
(VI)

wherein Q represents a hydrogen atom or an alkyl group having 1 to 6 carbon atoms, when n is 2.

Among them, preferred examples of the organic phosphorous acid compound (C) of the formula (I) are described below. Here, as to a compound name, for example, 3,9-bis(2,6-di-tert-butyl-4-methylphenoxy)-2,4,8,10-tetraoxa-3,9-diphosphaspiro[5.5]undecane represented by the formula (VII):

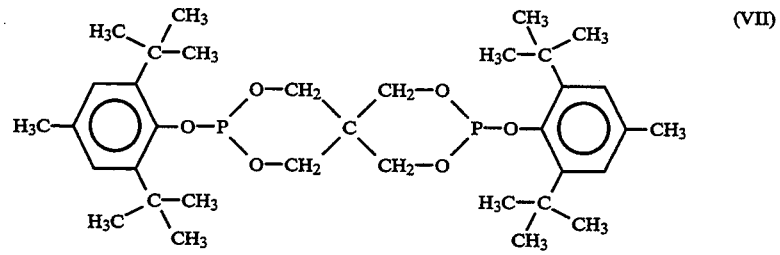
(VII)

is called bis(2,6-di-tert-butyl-4-methylphenyl)pentaerythritol diphosphite which is a general name. Other specific organic phosphorous acid compounds (C) are also described according to this nomenclature.

As a specific preferred example of the organic phosphorous acid compound (C), there may be mentioned (phenyl) (1,3-propanediol)phosphite, (4-methylphenyl) (1,3-propanediol)phosphite, (2,6-dimethylphenyl) (1,3-propanediol)phosphite, (4-tert-butylphenyl) (1,3-propanediol)phosphite, (2,4-di-tert-butylphenyl)(1,3-propanediol)phosphite, (2,6-di-tert-butylphenyl)(1,3-propanediol)phosphite and (2,6-di-tert-butyl-4-methylphenyl)(1,3-propanediol)phosphite; (phenyl)(1,2-ethanediol)phosphite, (4-methylphenyl) (1,2-ethanediol)phosphite, (2,6-dimethylphenyl) (1,2-ethanediol)phosphite, (4-tert-butylphenyl) (1,2-ethanediol)phosphite, (2,4-di-tert-butylphenyl) (1,2-ethanediol)phosphite, (2,6-di-tert-butylphenyl) (1,2-ethanediol)phosphite, (2,6-di-tert-butyl-4-methylphenyl)(1,2-ethanediol)phosphite and (2,6-di-tert-butyl-4-methylphenyl)(1,4-butanediol)phosphite; and diphenylpentaerythritol diphosphite, bis(2-methylphenyl) pentaerythritol diphosphite, bis(3-methylphenyl)pentaerythritol diphosphite, bis(4-methylphenyl)pentaerythritol diphosphite, bis(2,4 -dimethylphenyl)pentaerythritol diphosphite, bis(2,6-dimethylphenyl)pentaerythritol diphosphite, bis(2,4,6-trimethylphenyl)pentaerythritol diphosphite, bis(2-tert-butylphenyl)pentaerythritol diphosphite, bis(3-tert-butylphenyl)pentaerythritol diphosphite, bis(4-tert-butylphenyl)pentaerythritol diphosphite, bis(2,4-di-tert-butylphenyl)pentaerythritol diphosphite, bis(2,6-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, bis(nonylphenyl)pentaerylthritol diphosphite, bis (biphenyl)pentaerythritol diphosphite and dinaphthylpentaerythritol diphosphite.

Among them, as a more preferred organic phosphorous acid compound (C), there may be mentioned bis(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite or a mixture of them.

The composition of the present invention may contain a phosphor compound formed by decomposition (hydrolysis or pyrolysis) of the organic phosphorous acid compound (C).

In the process of the present invention, it is preferred to remove part or whole part of a hydroxy compound derived from the organic phosphorous acid compound (C) as explained below during the reaction and/or after completion of the reaction.

<Hydroxy compound derived from the organic phosphorous acid compound (C)>

The hydroxy compound derived from the organic phosphorous acid compound (C) is a compound formed by hydrolysis of the organic phosphorous acid compound (C) or the reaction scheme (II) described above, represented by the formula (VIII):

ArOH         (VIII)

wherein Ar has the same meaning as defined above.
<Acid receptor (D)>

The acid receptor (D) to be used in the present invention is a compound for neutralizing an acidic substance or bringing it close to a neutral state. In the present invention, a known acid receptor may be used.

As an example thereof, there may be mentioned apatites, hydrocalmites, hydrotalcites, metallic soaps, alkali soaps, alkali metal oxides, alkaline earth metal oxides, alkali metal hydroxides, alkaline earth metal hydroxides and amines.

Among them, preferred are, for example, synthetic or natural apatites, hydrocalmites, hydrotalcites and metallic soaps such as zinc stearate, calcium stearate, magnesium stearate, barium stearate, calcium laurate and zinc laurate. Particularly preferred are hydrotalcites, zinc stearate and calcium stearate.

In the process for preparing the composition of the present invention, kneading is preferably carried out in the presence of a compound having a boiling point of 35° C. to 300° C. at normal pressure as explained below.

<Compound having a boiling point of 35° C. to 300° C. at normal pressure>

The compound having a boiling point of 35° C. to 300° C. to be used in the present invention may have any molecular structure. There may be mentioned, for example, an aromatic hydrocarbon such as benzene, toluene, xylene, ethylbenzene, diethylbenzene, propylbenzene, dipropylbenzene, mesitylene, tetrahydronaphthalene (tetralin) and biphenyl; a chain or cyclic aliphatic hydrocarbon such as heptane, cyclohexane and decahydronaphthalene (decalin); a halogenated hydrocarbon such as chlorobenzene, dichlorobenzene, trichlorobenzene, chloroform and dichloromethane; ethers such as dioxane, anisole, phenetole and phenyl ether; thioethers such as diphenyl sulfide; ketones such as cyclohexanone, methyl ethyl ketone, acetophenone and benzophenone; nitriles such as acetonitrile and benzonitrile; esters such as ethyl acetate, phenyl acetate and methyl benzoate; a nitro compound such as nitrobenzene; an amide compound such as N-methylpyrrolidone; and an amino compound such as triethylamine, trioctylamine and N,N-dimethylaniline. These compounds may be used singly or as a mixture. Preferred are compounds which are good solvents for PPE, and more preferred are an aromatic hydrocarbon and a halogenated hydrocarbon. Particularly preferred are xylene, toluene, dichlorobenzene and trichlorobenzene.

The reason why physical properties such as mechanical strength are improved by using these compounds is estimated as described below.

It has been known that in a non-compatible resin composition, a dispersion phase is finer as the melting viscosity ratio of a dispersion phase and a non-dispersion phase is closer to 1 (S. Wu, "Polymer Engineering and Science", 27, 335 (1987)). In the thermoplastic resin composition comprising PPE and the saturated polyester of the present invention, the meltings. viscosity of PPE is higher than that of the saturated polyester, and when polybutylene terephthalate is used as a saturated polyester, the viscosity ratio is an order of 10 to 100 although it varies depending on the conditions such as melting temperature and shear rate. To the contrary, the above compounds such as xylene described above have affinity for PPE which is a non-crystalline resin and have functions of lowering the melting viscosity of PPE and making the viscosity ratio of PPE and the saturated polyester as small as possible.

<Formulation ratio of the respective components>

From the point of a balance of heat resistance, solvent resistance and molding processability, the formulation ratio of Component (A) in the thermoplastic resin composition is preferably 10 to 90% by weight, more preferably 20 to 80% by weight, and the formulation ratio of Component (B) is preferably 90 to 10% by weight, more preferably 80 to 20% by weight based on the total weight of Components (A) and (B).

If the ratio of Component (A) is less than 10% by weight, an effect of improving heat resistance is small, while if it exceeds 90% by weight, solvent resistance and molding processability are worsened.

If the ratio of Component (B) is less than 10% by weight, effects of improving solvent resistance and molding processability are small, while if it exceeds 90% by weight, heat resistance is not sufficient.

The formulation ratio of Component. (C) is preferably 0.1 to 10 parts by weight, more preferably 0.1 to 5 parts by weight, particularly preferably 0.1 to 4 parts by weight based on 100 parts by weight of Components (A) and (B) . If the ratio is less than 0.1 part by weight, an effect as a compatibilizer is small and an effect of improving physical properties is insufficient, while if it exceeds 10 parts by weight, appearance of a molded product may have problems.

The formulation ratio of Component (D) is preferably 0 to 10 parts by weight, more preferably 0 to 5 parts by weight, particularly preferably 0 to 2 parts by weight based on 100 parts by weight of Components (A) and (B) .

The amount of the compound having a boiling point of 35° C. to 300° C. at normal pressure to be added is preferably 0.2 to 20 parts by weight, more preferably 0.5 to 10 parts by weight based on 100 parts by weight of Components (A) and (B). If the added amount is less than 0.2 part by weight, an effect of improving compatibility is small, while if it exceeds 20 parts by weight, said effect is saturated and a problem in safety of operations is caused.

<Additional components>

To the thermoplastic resin composition of the present invention, additional components other than Components (A), (B), (C) and (D) described above may be added. For example, in order to increase compatibility by Component (C), one or more known aid(s) for esterification by a phosphorous acid compound may be used. As the aid, there may be mentioned a halogenated alkali metal salt such as lithium chloride, pyridine or a derivative thereof, tertiary amine and an amide compound such as N-methylpyrrolidone. The amount of these compounds to be added is preferably 0.1 to 5-fold in terms of a molar ratio based on the amount of a phosphor atom.

Also, 0.01 to 5% by weight of an antioxidant or a weather resistance improver; 5 to 30%: by weight of a plasticizer or a fluidity improver; 0.5 to 2% by weight of a nucleating agent; or 3 to 15% by weight of a flame retardant may be used as an additional component.

Further, it is effective for improving rigidity, heat resistance or dimensional precision to add 10 to 45% by weight of an organic filler, an inorganic filler or a reinforcing agent, particularly glass fiber, mica, talc, wallastonite, potassium titanate, calcium carbonate or silica. Also, 0.5 to 5% by weight of a coloring agent or a dispersant thereof may be formulated.

Further, it is effective for improving strength of the thermoplastic resin composition to add an impact modifier, particularly styrene-butadiene copolymer rubber or a hydride thereof, ethylene-propylene copolymer rubber, ethylene-propylene-diene terpolymer rubber, α,β-unsaturated carboxylic acid anhydride-modified products thereof, glycidyl ester- or unsaturated glycidyl ether-modified products thereof, a copolymer comprising an unsaturated epoxy compound and ethylene, an unsaturated epoxy compound and a copolymer comprising ethylene and an ethylene type unsaturated compound.

The above impact modifiers may be used singly or in combination of two or more. The formulation ratio of the impact modifier varies depending on aimed physical property values, but it may be, for example, 5 to 30% by weight in the thermoplastic resin composition in order to improve a balance between rigidity and impact resistance of the thermoplastic resin composition.

If necessary, other thermoplastic resin such as a polystyrene, polycarbonate and polyamide may be added.

<Preparation process of the thermoplastic resin composition>

The thermoplastic resin composition of the present invention is preferably prepared by melting and kneading. As a melting and kneading method, there may be used a generally used method of kneading a thermoplastic resin composition. For example, the respective Components (A), (B), (C) and (D), the compound having a boiling point of 35° C. to 300° C. at normal pressure and, if necessary, additives described in <Additional components> are uniformly mixed by a Henschel mixer, a ribbon blender or a twin-cylinder mixer, and then the mixture is kneaded by a single axis or plural axis kneading extruder, a roll mixer, a Banbury mixer or a Labo-plasto mill (Brabender).

The respective components may be fed simultaneously or successively to a kneading machine. Also, it may be used a provisionally mixed material in which at least two components selected from the respective components including additive components are previously mixed and fed into the kneading machine. Preferred is that Components (B) and (C) are co-presented when Component (A) is melted since, if PPE (A) alone is melted, the amino type nitrogen of PPE (A) will be lost before the reaction with Components (B) and (C).

The kneading temperature and kneading time may be selected optionally depending on the conditions of a desired amount of a block and/or graft copolymer to be formed and the kind of a kneader, but the kneading temperature is preferably 150° to 350° C. and the kneading time is preferably 20 minutes or shorter. if the kneading temperature exceeds 350° C. and the kneading time exceeds 20 minutes, heat deteriorations of Components (A), (B) and (C) are caused, whereby physical properties of a molded product may be lowered or appearance thereof may be worsened.

In the preparation process of the present invention, at least part or all of at least one of the amine compound derived from Component (A) and the hydroxy compound derived from Component (C) described above is removed.

The reason why a composition having excellent physical properties can be obtained by removing a part or all of at least one of the amine compound derived from Component (A) and the hydroxy compound derived from Component (C) is not certain. The following effects (1) and (2) may be estimated, but the present invention is not limited by these estimations.

(1) Effect of accelerating compatibility

It has been described above that the compatibility of PPE (A) and the saturated polyester (B) realized in the present invention is considered to be brought about by the reaction scheme represented by the above formula (II). It is considered that if the above reaction can proceed sufficiently, a thermoplastic resin composition having further excellent physical properties can be prepared. For this purpose, it is effective to remove part or all of ArOH from the reaction system.

Further, excessive ArOH exerts bad influence on weather resistance of a thermoplastic resin composition.

(2) Effect of preventing lowering of molecular weight of saturated polyester

It has been widely known that a saturated polyester in a melted state is hydrolyzed with an extremely small amount of water. Amines have possibility of acting as a catalyst of hydrolysis reaction of a saturated polyester.

Also, amines have possibility of causing ester-amide exchange reaction.

These reactions lower a molecular weight of a saturated polyester significantly and exert undesirable influences on physical properties such as impact resistance and retention stability of a thermoplastic resin composition.

Thus, in order to prepare a thermoplastic resin composition having excellent physical properties, it is important to remove amines generated from PPE (A).

The method of removing part or all of at least one of the amine compound derived from Component (A) and the hydroxy compound derived from Component (C) is not particularly limited.

A part or all of at least one of the amine compound derived from Component (A) and the hydroxy compound derived from Component (C) is removed preferably by heating under reduced pressure, more preferably by placing the composition in a melted state under reduced pressure atmosphere.

The pressure-reducing degree varies depending on kneading temperature and a boiling point of a compound to be removed, but may be 760 mmHg or less, preferably 600 mmHg or less in terms of absolute pressure. The kneading temperature is generally as high as about 250° C. so that a high effect can be obtained by a slight pressure-reducing degree.

The effect of the present invention can be obtained by removing at least one of the amine compound derived from Component (A) and the hydroxy compound derived from Component (C), but it is preferred to remove both of them.

The ratio of the hydroxy compound derived from Component (C) to be removed is not limited, but it is preferably 5% by weight or more of the hydroxy compound derived from Component (C).

The ratio of the amine compound derived from Component (A) to be removed varies depending on the ratio of PPE (A) contained in the thermoplastic resin composition. In either case, it is preferred to remove 5% by weight or more of the amine compound derived from Component (A).

One preferred embodiment of the present invention is, for example, a method using a kneader by which a melted resin can be treated under reduced pressure atmosphere. It is specifically a method using a single axis or plural axis kneading extruder equipped with a pressure-reducing device such as a pressure-reducing pump and an aspirator at a vent port.

In the present invention, it is not preferred that the organic phosphorous acid compound (C) and a phosphor compound formed by the reaction are removed. This is because the organic phosphorous acid compound (C) and the phosphor compound formed by the reaction have characteristics that they also function as antioxidants Thus, the preparation process of the present invention is preferably carried out under reduced pressure condition where the organic phosphorous acid compound (C) and the phosphor compound formed by the reaction are not removed. That is, it is preferred that 80% or more, preferably 90% or more of phosphor atoms contained in the used organic phosphorous acid compound (C) remain in the thermoplastic resin composition. In order to obtain stabilities of heat resistance and antioxidant action of the thermoplastic resin composition, it is effective to add the organic phosphorous acid compound (C) again, if necessary, although it depends on the kind of the used organic phosphorous acid compound (C), melting and kneading temperatures and a pressure-reducing degree during melting and kneading.

The respective components including the additional components described above and the compound having a boiling point of 35° C. to 300° C. at normal pressure may be fed to a kneader simultaneously or successively. When the compound having a boiling point of 35° C. to 300° C. at normal pressure is fed in the course of kneading, it may be convenient to use a pump for feeding. Here, there may be used a mixture obtained by previously mixing two or more components selected from the respective components including the additional components described above and the compound having a boiling point of 35° C. to 300° C. at normal pressure.

Also, a component containing the compound having a boiling point of 35° C. to 300° C. at normal pressure may be used. As such a compound, there may be used PPE prepared by a method in which a part or all of a process of removing a solvent after polymerization is omitted.

The compound having a boiling point of 35° C. to 300° C. at normal pressure is preferably removed from the composition during melting and kneading, after melting and kneading or both of them. The amount to be removed is preferably 50% by weight, more preferably 70% by weight of the used amount of the compound having a boiling point of 35° C. to 300° C. at normal pressure. If the removed amount is less than 50% by weight, heat-resistant physical properties such as heat distortion temperature may be lowered.

The removing method is not particularly limited and may be preferably a method of distilling the compound having a boiling point of 35° C. to 300° C. at normal pressure preferably under heating during kneading or after kneading, more preferably a method of removing it under reduced pressure atmosphere by using a single axis or plural axis kneader equipped with a pressure-reducing device. The pressure varies depending on a boiling point of a compound to be used and a temperature of a resin, but may be preferably 600 mmHg or less, more preferably 300 mmHg or less. If the pressure exceeds 600 mmHg, a large amount of the compound having a boiling point of 300° C. or lower remains in the composition to worsen thermal characteristics of the composition.

<Molding method of the thermoplastic resin composition composition>

In the present invention, a molding processing method of the thermoplastic resin composition is not particularly limited, and there may be suitably used various molding methods generally used for a thermoplastic resin composition, i.e. injection molding, hollow molding, extrusion molding and press molding.

EXAMPLES.

The present invention is described in detail by referring to Examples, but the present invention is not limited by these Examples. In the following, "part" and "%" mean "part by weight" and "% by weight", respectively.

Examples 1 to 6 and Comparative examples 1 to 6

The following respective components were used.
(A) PPE

Three kinds of poly(2,6-dimethyl-1,4-phenylene ether) produced by Nippon Polyether Co. having an intrinsic viscosity measured at 30° C. in chloroform of 0.30 dl/g (hereinafter referred to as "H-30"), having that of 0.41 dl/g (hereinafter referred to as "H-41") and having that of 0.51 dl/g (hereinafter referred to as "H-51").

(B) Saturated polyester
1) Polybutylene terephthalate
①  Novadur 5010 Grade (trade name) produced by Mitsubishi Kasei Corporation having a number average molecular weight (Mn) of 30,000 and a weight average molecular weight (Mw) of 99,000 both of which were calculated on polystyrene standard measured by gel permeation chromatography (GPC) (hereinafter referred to as "PBT-1").

②  K-128 Grade (trade name) produced by Kanebo, Ltd. having Mn of 42,000 and Mw of 116,000 calculated on polystyrene standard measured by GPC (hereinafter referred to as "PBT-2") .

2) Polyethylene terephthalate
PBX-1 Grade (trade name) produced by Kanebo, Ltd. having an intrinsic viscosity of 0.65 dl/g (hereinafter referred to as "PET") .

(C) Organic phosphorous acid compound
1) Bis(2,6-di-tert-butyl-4-methylphenyl)pentaerythritol diphosphite: MARK PEP-36 (trade name) produced by Asahi Denka Co. (hereinafter referred to as "A") .

2) Bis(2,4-di-tert-butylphenyl)pentaerythritol diphosphite: MARK PEP-24G (trade name) produced by Asahi Denka Co. (hereinafter referred to as "B") .

3) Triphenyl phosphite: produced by Tokyo Kasei Co. (hereinafter referred to as "C") .

4) Distearylpentaerythritol diphosphite: MARK PEP-8 (trade name) produced by Asahi Denka Co. (hereinafter referred to as "D") .

5) Tris(nonylphenyl)phosphite: MARK-1178 (trade name) produced by Asahi Denka Co. (hereinafter referred to as "E").

Impact strength improver
Hydrogenated styrene-butadiene block copolymer: KRATON G-1651 Grade (trade name) produced by Shell Chemical Co. (hereinafter referred to as "SEBS").

According to the composition ratios shown in Table 1, the respective components were kneaded at a setting temperature of 250° C. with a rotary number of 180 rpm for 10 minutes by using a Laboplastomill extruder (trade name) manufactured by Toyo Seiki Seisakusho Co., and the mixtures were pulverized to obtain granular compositions.

Characteristics of the resulting compositions were measured and evaluated by measuring test pieces obtained by injection molding at a temperature of 280° C. by using a CS183MMX Minimax injection molding machine (trade name) manufactured by Custom Scientific Co., according to the following methods. The results are shown in Table 1.

When kneading or molding was carried out, polybutylene terephthalate, polyethylene terephthalate and the resin compositions which had been previously dried under reduced pressure at 120° C. for 5 hours were used.

(1) Impact resistance

Test pieces having a length of 31.5 mm, a width of 6.2 mm and a thickness of 3.2 mm were prepared by injection molding. By using a Minimax Izod impact tester CS-138TI (trade name) manufactured by Custom Scientific Co., Izod impact strength without notch at 23° C. was measured.

(2) Tensile strength

Tensile test pieces having a parallel length of 7 mm and a parallel portion diameter of 1.5 mm were prepared by injection molding. By using a tensile tester CS-183TE (trade name) manufactured by Custom Scientific Co., a tensile test was conducted under a condition of a tensile rate of 1 cm/min to measure stress at break and elongation at break.

As to Examples 1 to 3 and Comparative examples 1 to 4, as an index of improving compatibility by using the organic phosphorous acid compound (C), each dispersed particle size of PPE domain dispersed in a matrix of polybutylene terephthalate was measured by using a scanning type electron microscope S-2400 (trade name) manufactured by Hitachi, Ltd.

example 5, or Example 6 and Comparative example 6), respective properties can be remarkably improved.

Examples 7 to 12 and Comparative Examples 7 to 10

In the same manner as in Examples 1 to 6 except for using the composition ratios of the respective components shown in Table 2, melting and kneading, injection molding and evaluation of physical properties were carried out. The results are shown in Table 2.

TABLE 2

| Composition (parts) | Example | | | | | | Comparative example | | | |
|---|---|---|---|---|---|---|---|---|---|---|
| | 7 | 8 | 9 | 10 | 11 | 12 | 7 | 8 | 9 | 10 |
| Component (A) H-41 | 40 | 40 | 40 | 40 | 30 | — | 40 | 40 | 30 | — |
| Component (A) H-51 | — | — | — | — | — | 40 | — | — | — | 40 |
| Component (B) PBT-1 | 60 | 60 | 60 | — | 70 | 60 | 60 | — | 70 | 60 |
| Component (B) PBT-2 | — | — | — | 60 | — | — | — | 60 | — | — |
| Component (C) A | 1 | 0.5 | 3 | 1 | 1 | 1 | — | — | — | — |
| Evaluation results | | | | | | | | | | |
| Impact resistance (kg · cm/cm$^2$) | 58.6 | 53.8 | 52.2 | 58.1 | 52.9 | 38.5 | 11.8 | 14.3 | 16.5 | 11.8 |
| Tensile break strength (kg/cm$^2$) | 512 | 545 | 559 | 473 | 549 | 452 | 248 | 267 | 334 | 334 |
| Tensile break elongation (%) | 18 | 21 | 75 | 150 | 207 | 16 | 10 | 13 | 13 | 12 |

Examples 13 and 14 and Comparative Examples 11 to 13

According to the composition ratios of the respective components shown in Table 3, the respective components were sufficiently mixed by a super mixer and the mixtures were kneaded by using a biaxial extruder TEX-44 (trade name) manufactured by Nippon Seikosho Co. under conditions of a setting temperature of 210° C., a screw rotary number of 150 rpm and an extrusion amount of 40 kg/hour to obtain pellets. When the mixtures were kneaded, deaeration under reduced pressure was carried out at a latter stage vent port.

Then, in the same manner as in Examples 1 to 6, the resulting compositions of Example 13 and Comparative examples 11 and 12 were molded and characteristics thereof were evaluated.

As to Example 13 and Comparative examples 11 and 12, as an index of an amount of a formed block or graft polymer which improves compatibility by using the

TABLE 1

| Composition (parts) | Example | | | | | | Comparative example | | | | | |
|---|---|---|---|---|---|---|---|---|---|---|---|---|
| | 1 | 2 | 3 | 4 | 5 | 6 | 1 | 2 | 3 | 4 | 5 | 6 |
| Component (A) H-30 | 40 | 40 | 40 | 50 | 20 | 70 | 40 | 40 | 40 | 40 | 20 | 70 |
| Component (B) BT-1 | 60 | 60 | 60 | 50 | 80 | 30 | 60 | 60 | 60 | 60 | 80 | 30 |
| Component (C) A | 1 | — | 0.5 | 1 | 1 | 1 | — | — | — | — | — | — |
| Component (C) B | — | 1 | — | — | — | — | — | — | — | — | — | — |
| Component (C) C | — | — | — | — | — | — | — | 1 | — | — | — | — |
| Component (C) D | — | — | — | — | — | — | — | — | 1 | — | — | — |
| Component (C) E | — | — | — | — | — | — | — | — | — | 1 | — | — |
| Evaluation results | | | | | | | | | | | | |
| Impact resistance (kg · cm/cm$^2$) | 42.3 | 37.7 | 36.8 | 47.0 | 52.0 | 20.4 | 15.7 | 25.8 | 16.1 | 18.3 | 25.6 | 16.3 |
| Tensile break strength (kg/cm$^2$) | 493 | 504 | 387 | 530 | 535 | 432 | 252 | 396 | 288 | 305 | 441 | 248 |
| Tensile break elongation (%) | 17 | 19 | 16 | 20 | 210 | 14 | 10 | 12 | 11 | 11 | 18 | 9 |
| Dispersed particle size of PPE (μm) | 0.2 | 0.4 | 0.7 | — | — | — | 6.5 | 1.5 | 5.0 | 5.0 | — | — |

As clearly seen from the results shown in Table 1, it can be understood that when the organic phosphorous acid compound of the present invention is used with the same composition of the PPE and the saturated polyester (e.g. when compared to the results of Example 1 and Comparative example 1, Example 5 and Comparative organic phosphorous acid compound (C), reactivity of PPE was determined according to the following equation:

$$\text{PPE reactivity (\%)} = 100 \times (\alpha - \beta)/\alpha$$

wherein α is a total weight of PPE components in a composition and β is a weight of unreacted PPE components in a composition.

β was determined as described below.

A composition of weighed PPE and polybutylene terephthalate was dipped and swelled in a mixed solution of chloroform and hexafluoroisopropanol (volume ratio: 1:1). To the solution were added tetrahydrofuran and chloroform successively, and unreacted PPE components were isolated from a solution phase and weighed to obtain a β value.

Test pieces of the resulting compositions of Example 14 and Comparative example 13 were prepared by injection molding by using an inline screw type injection molding machine IS-90B (trade name) manufactured by Toshiba Kikai Seisakusho Co. at a cylinder temperature of 260° C. and a mold-cooling temperature of 80° C., and measured and evaluated according to the methods described below.

Vacuum drying was carried out at 120° C. for 5 hours until immediately before injection molding.

(1) Impact resistance

Impact resistance was measured according to ISO R180-1969 (JIS K 7110) Izod impact test with notch by using an Izod impact tester manufactured by Toyo Seiki Seisakusho.

(2) Tensile strength

Tensile strength was measured according to ISO R527-66 (JIS K 7113) tensile strength by using an Instron tester.

The results are shown in Table 3.

TABLE 3

| Composition (parts) | Example | | Comparative example | | |
|---|---|---|---|---|---|
| | 13 | 14 | 11 | 12 | 13 |
| Component (A) PPE H-41 | 40 | 30 | 40 | 40 | 30 |
| Component (B) PBT-2 | 60 | 70 | 60 | 60 | 70 |
| Component (C) A | 1 | 1 | — | — | — |
| Component (C) C | — | — | 1 | — | — |
| SEBS | — | 15 | — | — | 15 |
| Evaluation results | | | | | |
| Impact resistance (kg · cm/cm$^2$) | 47.1 | 24 | 21.6 | 11.7 | 3* |
| Tensile break strength (kg/cm$^2$) | 504 | 400 | 395 | 354 | 360 |
| Tensile break elongation (%) | 179 | 40 | 14 | 14 | 5 |
| PPE reactivity (%) | 25 | — | 8 | 5 | — |

*: with notch

Examples 15 and 16 and Comparative examples 14 and 15

In the same manner as in Examples 1 to 6 except for using polyethylene terephthalate in place of polybutylene terephthalate and changing the setting temperature of the kneader to 260° C., kneading and molding were carried out to obtain test pieces for evaluating physical properties. These test pieces were subjected to heat treatment in a hot air dryer at a temperature of 120° C. for 4 hours to effect crystallization of polyethylene terephthalate sufficiently. Then, physical properties thereof were evaluated in the same manner as in Examples 1 to 6. The results are shown in Table 4.

TABLE 4

| Composition (parts) | Example | | Comparative example | |
|---|---|---|---|---|
| | 15 | 16 | 14 | 15 |
| Component (A) PPE H-30 | 40 | — | 40 | — |
| Component (A) PPE H-41 | — | 40 | — | 40 |
| Component (B) PET | 60 | 60 | 60 | 60 |

TABLE 4-continued

| Composition (parts) | Example | | Comparative example | |
|---|---|---|---|---|
| | 15 | 16 | 14 | 15 |
| Component (C) A | 1 | 1 | — | — |
| Component (C) C | — | — | 1 | — |
| Evaluation results | | | | |
| Impact resistance (kg · cm/cm$^2$) | 30.4 | 50.2 | 22.4 | 12.4 |
| Tensile break strength (kg/cm$^2$) | 548 | 650 | 440 | 439 |
| Tensile break elongation (%) | 16 | 22 | 14 | 14 |

The resin compositions of the present invention are thermoplastic resin compositions remarkably improved in compatibility of Components (A) and (B), having both of characteristics possessed by the respective resins, having high stiffness and rigidity, and well-balanced in mechanical strength.

Examples 17 to 24

The following respective components were used.

(A) PPE

① Three kinds of poly(2,6-dimethyl-1,4-phenylene ether) produced by Nippon Polyether Co. having an intrinsic viscosity measured at 30° C. in chloroform of 0.30 dl/g (hereinafter referred to as "PPE-1"), having that of 0.41 dl/g (hereinafter referred to as "PPE-2") and having that of 0.51 dl/g (hereinafter referred to as "PPE-3").

② The above PPE-1, PPE-2 and PPE-3 were melted by using a biaxial extruder TEX-44 (trade name) with vents manufactured by Nippon Seikosho Co. under conditions of a setting temperature of 250° C., a screw rotary number of 150 rpm and an extrusion amount of 30 kg/hour to obtain pellets. The pellets are hereinafter referred to as "PPE-1'", "PPE-2'" and "PPE-3'", respectively.

For these PPE, the respective nitrogen contents and number average molecular weights calculated on polystyrene by gel permeation chromatography were measured. The results are i0 shown in Table 5.

TABLE 5

| PPE | Amine content (ppm) | Number average molecular weight |
|---|---|---|
| PPE-1 | 1250 | 8.0 × 10$^3$ |
| PPE-1' | 430 | 8.4 × 10$^3$ |
| PPE-2 | 1200 | 1.5 × 10$^4$ |
| PPE-2' | 420 | 1.6 × 10$^4$ |
| PPE-3 | 1100 | 2.1 × 10$^4$ |
| PPE-3' | 380 | 2.3 × 10$^4$ |

(B) Saturated polyester

① Polybutylene terephthalate: Novadol 5010 Grade (trade name) produced by Mitsubishi Kasei Corporation having a number average molecular weight (Mn) of 30,000 and a weight average molecular weight (Mw) of 99,000 both of which were calculated on polystyrene standard measured by gel permeation chromatography (GPC) (hereinafter referred to as "PBT-1"). ② Polybutylene terephthalate: K-128 Grade (trade name) produced by Kanebo, Ltd. having Mn of 42,000 and Mw of 116,000 calculated on polystyrene standard measured by GPC (hereinafter referred to as "PBT-2").

(C) Organic phosphorous acid compound ① Bis(2,6-di-tert-butyl-4-methylphenyl)pentaerythritol diphosphite: MARK PEP-36 (trade name) produced by Asahi Denka Co. (hereinafter referred to as "PEP36").

② Bis(2,4-di-tert-butylphenyl)pentaerythritol diphosphite: MARK PEP-24G (trade name) produced by Asahi Denka Co. (hereinafter referred to as "PEP24G").

Impact strength improver

Hydrogenated styrene-butadiene block copolymer: KRATON G-1651 Grade (trade name) produced by Shell Chemical Co. (hereinafter referred to as "SEBS").

According to the composition ratios shown in Table 6, the respective components were kneaded at a setting temperature of 250° C. with a rotary number of 180 rpm for 10 minutes by using a Laboplastomill extruder (trade name) manufactured by Toyo Seiki Seisakusho Co., and the mixtures were pulverized to obtain granular compositions.

Characteristics of the resulting compositions were measured and evaluated by measuring test pieces obtained by injection molding at a temperature of 280° C. by using a CS183MMX Minimax injection molding machine (trade name) manufactured by Custom Scientific Co., according to the same methods as in Examples 1 to 6. The results are shown in Table 6.

TABLE 7

| Composition (parts) | Example 25 | Example 26 |
|---|---|---|
| Component (A) PPE-21 | 40 | 40 |
| Component (B) PBT-2 | 60 | 60 |
| Component (C) PEP36 | 1 | 1 |
| Trioctylamine | 1 | — |
| Evaluation results | | |
| Izod impact strength (kg · cm/cm$^2$) | 38.7 | 21.3 |
| Tensile break strength (kg/cm$^2$) | 452 | 403 |
| Tensile break elongation (%) | 17 | 11 |

Examples 27 and 28

In the same manner as in Example 25 except for using the composition ratios shown in Table 8, pellets of compositions were prepared.

Test pieces of the resulting compositions were prepared by injection molding by using an inline screw type injection molding machine IS-90B (trade name) manufactured by Toshiba Kikai Seisakusho Co. at a cylinder temperature of 260° C. and a mold-cooling temperature of 80° C., and measured and evaluated according to the methods described below. The results are shown in Table 8.

(1) Impact resistance

Impact resistance was measured in the same manner as in Examples 13 and 14.

(2) Tensile strength

Tensile strength was measured in the same manner as in Examples 13 and 14.

(3) Surface luster degree

As an index of appearance of a molded product, a surface luster degree at an incident angle and a light-receiving angle of 60° was measured according to JIS Z 8741 luster degree test method.

TABLE 6

| Composition (parts) | Example 17 | Example 18 | Example 19 | Example 20 | Example 21 | Example 22 | Example 23 | Example 24 |
|---|---|---|---|---|---|---|---|---|
| Component (A) PPE-1 | 40 | — | — | — | 40 | — | — | — |
| Component (A) PPE-1' | — | 40 | — | — | — | 40 | — | — |
| Component (A) PPE-2 | — | — | 40 | — | — | — | — | — |
| Component (A) PPE-2' | — | — | — | 40 | — | — | — | — |
| Component (A) PPE-3 | — | — | — | — | — | 40 | — | — |
| Component (A) PPE-3' | — | — | — | — | — | — | — | 40 |
| Component (B) PBT-1 | 60 | 60 | 60 | 60 | 60 | 60 | 60 | 60 |
| Component (C) PEP36 | 1 | 1 | 1 | 1 | — | — | 1 | 1 |
| Component (C) PEP24G | — | — | — | — | 1 | 1 | — | — |
| Evaluation results | | | | | | | | |
| Izod impact strength (kg · cm/cm$^2$) | 42.3 | 20.1 | 58.6 | 15.3 | 37.7 | 18.1 | 38.5 | 19.2 |
| Tensile break strength (kg/cm$^2$) | 493 | 302 | 512 | 317 | 504 | 284 | 452 | 394 |
| Tensile break elongation (%) | 17 | 11 | 18 | 9 | 19 | 8 | 16 | 12 |

Examples 25 and 26

According to the composition ratios shown in Table 7, the respective components were sufficiently mixed by a super mixer and the mixtures were kneaded by using a biaxial extruder TEX-44 (trade name) with vents manufactured by Nippon Seikosho Co. under conditions of a setting temperature of 210° C., a screw rotary number of 250 rpm and an extrusion amount of 40 kg/hour to obtain pellets. The resulting compositions were evaluated in the same manner as in Example 17. The results are shown in Table 7.

| Composition (parts) | Example 27 | Example 28 |
|---|---|---|
| Component (A) PPE-2 | 30 | — |
| Component (A) PPE-2' | — | 30 |
| Component (B) PBT-2 | 70 | 70 |
| Component (C) PEP36 | 1 | 1 |
| SEBS | 15 | 15 |
| Evaluation results | | |
| Izod impact strength (kg · cm/cm$^2$) | 46.2 | 12.1 |
| Tensile break strength (kg/cm$^2$) | 375 | 403 |
| Tensile break elongation (%) | 23 | 9 |
| Surface luster (%) | 47 | 8 |

Examples 29 to 31

The following respective components were used.
(A) PPE

Poly(2,6-dimethyl-1,4-phenylene ether) produced by Nippon Polyether Co. having an intrinsic viscosity measured at 30° C. in chloroform of 0.41 dl/g (hereinafter referred to as "PPE").

(B) Saturated polyester

Polybutylene terephthalate: K-128 Grade (trade name) produced by Kanebo, Ltd. having a number average molecular weight of 42,000 and a weight average molecular weight of 116,000 calculated on polystyrene measured by gel permeation chromatography (hereinafter referred to as "PBT").

(C) Organic phosphorous acid compound

As the organic phosphorous acid compound (C) of the present invention, the following 1) and 2) were used, and as other organic phosphorous acid compound, the following 3) was used.

1) Bis(2,6-di-tert-butyl-4-methylphenyl)pentaerythritol diphosphite: MARK PEP-36 (trade name) produced by Asahi Denka Co. (hereinafter referred to as "PEP36").
2) Bis(2,4-di-tert-butylphenyl)pentaerythritol diphosphite: MARK PEP-24G (trade name) produced by Asahi Denka Co. (hereinafter referred to as "PEP24G").
3) Triphenyl phosphite: produced by Tokyo Kasei Co. (hereinafter referred to as "TPP").

Impact strength improver

Hydrogenated styrene-butadiene block copolymer: KRATON G-1651 Grade (trade name) produced by Shell Chemical Co. (hereinafter referred to as "SEBS").

According to the composition ratios shown in Table 10, the respective components were sufficiently mixed by a super mixer and the mixtures were kneaded by using a biaxial extruder TEX-44 (trade name) with vents manufactured by Nippon Seikosho Co. under conditions of a setting temperature of 210° C., a screw rotary number of 250 rpm and an extrusion amount of 40 kg/hour to obtain pellets. When the mixtures were kneaded, deaeration under reduced pressure was carried out at a pressure of 50 mmHg by using a pressure-reducing pump attached to a latter stage vent port to remove an amine compound derived from PPE and a hydroxy compound derived from the organic phosphoric acid compound. At the latter stage vent port, a large amount of an attached substance was observed. Components and a composition ratio of the attached substance obtained in Example 29 are shown in Table 9. As the composition ratio, an area ratio of peaks by gas chromatography was used. 2,6-Di-tert-butyl-4-methylphenol was formed from bis(2,6-di-tert-butyl-4-methylphenyl)pentaerythritol diphosphite, and n-dibutylamine was formed from PPE having a terminal structure of the following formula (IX):

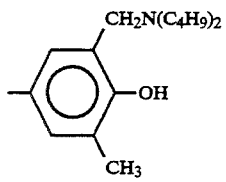

(IX)

used in Example 29.

TABLE 9

| Attached substance | Composition ratio (%) |
| --- | --- |
| 2,6-Di-tert-butyl-4-methylphenol | 43 |
| n-Dibutylamine | 19 |
| Others[a] | 38 |

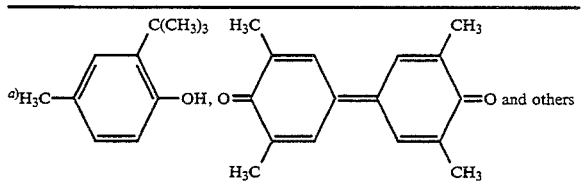

[a] (structure shown above) and others

From the above pellets, test pieces were prepared by injection molding by using an inline screw type injection molding machine IS-90B (trade name) manufactured by Toshiba Kikai Seisakusho Co. at a cylinder temperature of 260° C. and a mold-cooling temperature of 80° C., and measured and evaluated according to the methods described below. The results are shown in Table 10.

(1) Impact resistance

Impact resistance was measured in the same manner as in Examples 13 and 14.

(2) Tensile strength

Tensile strength was measured in the same manner as in Examples 13 and 14.

(3) Surface luster degree

Surface luster degree was measured in the same manner as in Example 27.

(4) Dispersed particle size

A dispersed particle size of PPE domain dispersed in a matrix of polybutylene terephthalate was observed by using a scanning type electron microscope S-2400 (trade name) manufactured by Hitachi, Ltd. As the dispersed particle size is smaller, compatibility is higher.

Examples 32 and 33

Procedures were carried out in the same manner as in Examples 29 to 31 except for attaching a tap aspirator to the latter stage vent port and carrying out deaeration under reduced pressure at a pressure of 300 mmHg to remove the hydroxy compound derived from the organic phosphorous acid compound and the amine compound derived from PPE. The results are shown in Table 10. At the vent port, a large amount of an attached substance was observed as in Examples 29 to 31.

Examples 34 and 35

Procedures were carried out in the same manner as in Examples 29 to 31 except for sealing the latter stage vent port so that the hydroxy compound derived from the organic phosphorous acid compound and the amine compound derived from PPE were not removed. The results are shown in Table 10.

Comparative example 16

Procedures were carried out in the same manner as in Examples 29 to 31 except for using triphenyl phosphite as the organic phosphorous acid compound. The results are shown in Table 10.

TABLE 10

|  | Example | | | | | | | Comparative example |
|---|---|---|---|---|---|---|---|---|
| Composition (parts) | 29 | 30 | 31 | 32 | 33 | 34 | 35 | 16 |
| Component (A) PE | 30 | 30 | 30 | 30 | 0 | 30 | 30 | 30 |
| Component (B) PBT | 70 | 70 | 70 | 70 | 70 | 70 | 70 | 70 |
| SEBS | 15 | 15 | 15 | 15 | 15 | 15 | 15 | 15 |
| Component (C) PEP36 | 1 | 2 | — | 1 | — | 1 | — | — |
| Component (C) PEP24G | — | — | 1 | — | 1 | — | 1 | — |
| Component (C) TPP | — | — | — | — | — | — | — | 1 |
| Evaluation results | | | | | | | | |
| Izod impact strength (kg · cm/cm$^2$) | 48.7 | 55.3 | 43.7 | 50.9 | 42.8 | 15.0 | 18.3 | 15.3 |
| Tensile break strength (kg/cm$^2$) | 370 | 384 | 374 | 366 | 372 | 386 | 372 | 418 |
| Tensile break elongation (%) | 28 | 35 | 26 | 29 | 31 | 25 | 24 | 12 |
| Surface luster (%) | 47 | 39 | 37 | 31 | 34 | 39 | 33 | 14 |
| Dispersed particle size of PPE (μm) | 0.38 | 0.27 | 0.39 | 0.37 | 0.41 | 0.32 | 0.39 | 1.4 |

Examples 36 to 42 and Comparative examples 17 and 18

The following respective components were used.

(A) PPE

Poly(2,6-dimethyl-1,4-phenylene ether) produced by Nippon Polyether Co. having an intrinsic viscosity measured at 30° C. in chloroform of 0.41 dl/g (hereinafter referred to as "PPE").

(B) Saturated polyester

Polybutylene terephthalate: K-124 Grade (trade name) (intrinsic viscosity: 2.48) produced by Kanebo, Ltd. (hereinafter referred to as "PBT").

(C) Organic phosphorous acid compound

1) Bis(2,6-di-tert-butyl-4-methylphenyl)pentaerythritol diphosphite: MARK PEP-36 (trade name) produced by Asahi Denka Co. (hereinafter referred to as "PEP36").

2) Bis (2,4-di-tert-butylphenyl) pentaerythritol diphosphite: MARK PEP-24G (trade name) produced by Asahi Denka Co. (hereinafter referred to as "PEP24").

Impact strength improver

Hydrogenated styrene-butadiene block copolymer, KRATON G-1651 Grade (trade name) produced by Shell Chemical Co. (hereinafter referred to as "SEBS").

Compound having a boiling point of 35° C. to 300° C. at normal pressure

1) Xylene (a mixture of o-xylene, m-xylene and p-xylene) (b.p.: 135° to 143° C.)

2) 1,2,4-trichlorobenzene (b.p.: 210° C.)

According to the composition ratios shown in Table 11, the respective components were sufficiently mixed by a super mixer and the mixtures were kneaded by using a biaxial extruder TEX-44 (trade name) manufactured by Nippon Seikosho Co. under conditions of a setting temperature of 210° C., a screw rotary number of 250 rpm and an extrusion amount of 40 kg/hour to obtain pellets. The pressure at the vent ports was 200 mmHg.

Test pieces of the resulting compositions were prepared by injection molding by using an inline screw type injection molding machine IS-90B (trade name) manufactured by Toshiba Kikai Seisakusho Co. at a cylinder temperature of 260° C. and a mold-cooling temperature of 80° C., and physical properties thereof were evaluated. The results are shown in Table 11.

Physical properties were evaluated according to the methods described below.

(1) Impact resistance and (2) Tensile strength

Impact resistance and tensile strength were measured in the same manner as in Examples 13 and 14.

(3) Heat distortion temperature

Heat distortion temperature was measured with a load of 4.6 kg by using an HDT tester (trade name) manufactured by Tokyo Seiki Seisakusho Co. according to JIS K 7207.

TABLE 11

|  | Example | | | | | | | Comparative example | |
|---|---|---|---|---|---|---|---|---|---|
| Composition (parts) | 36 | 37 | 38 | 39 | 40 | 41 | 42 | 17 | 18 |
| Component (A) PPE | 30 | 30 | 30 | 30 | 30 | 30 | 30 | 30 | 30 |
| Component (B) PBT | 70 | 70 | 70 | 70 | 70 | 70 | 70 | 70 | 70 |
| SEBS | 15 | 15 | 15 | 15 | 15 | 15 | 15 | 15 | 15 |
| Component (C) PEP36 | 1 | 1 | 2 | 1 | 1 | — | 1 | — | — |
| Component (C) PEP24 | — | — | — | — | 1 | — | — | — | — |
| Xylene | 1 | 3 | 3 | 5 | — | 3 | — | 3 | — |
| Trichlorobenzene | — | — | — | — | 3 | — | — | — | 3 |
| Evaluation results | | | | | | | | | |
| Izod impact strength | | | | | | | | | |
| 23° C. (kg · cm/cm$^2$) | 58.9 | 63.5 | 62.3 | 60.5 | 68.2 | 50.3 | 18.5 | 9.4 | 8.7 |
| −30° C. (kg · cm/cm$^2$) | 10.7 | 11.1 | 11.6 | 10.8 | 11.9 | 9.8 | 7.1 | 2.2 | 1.6 |
| Tensile break strength (kg/cm$^2$) | 399 | 419 | 401 | 405 | 401 | 405 | 392 | 425 | 431 |
| Tensile break elongation | 130 | 166 | 105 | 145 | 172 | 120 | 85 | 12 | 10 |
| Heat distortion tem- | 172 | 174 | 169 | 167 | 171 | 170 | 174 | 175 | 173 |

TABLE 11-continued

|  | Example | | | | | | | Comparative example | |
|---|---|---|---|---|---|---|---|---|---|
| Composition (parts) | 36 | 37 | 38 | 39 | 40 | 41 | 42 | 17 | 18 |
| perature (°C.) | | | | | | | | | |

Examples 43 to 49

The following respective components were used.
(A) PPE
Poly (2,6-dimethyl-1,4-phenylene ether) produced by Nippon Polyether Co. having an intrinsic viscosity measured at 30° C. in chloroform of 0.41 dl/g (hereinafter referred to as "PPE").
(B) Saturated polyester
Polybutylene terephthalate: K-128 Grade (trade name) (intrinsic viscosity measured at 20° C. by using a mixed solvent of phenol and 1,1,2,2-tetrachloroethane (weight ratio: 4:6): 2.85 dl/g) produced by Kanebo, Ltd. (hereinafter referred to as "PBT").
(C) Organic phosphorous acid compound
① Bis(2,6-di-tert-butyl-4-methylphenyl)pentaerythritol diphosphite: MARK PEP-36 (trade name) produced by Asahi Denka Co. (hereinafter referred to as "PEP36").
② Bis(2,4-di-tert-butylphenyl)pentaerythritol diphosphite: MARK PEP-24G (trade name) produced by Asahi Denka Co. (hereinafter referred to as "PEP24").
(D) Acid receptor
① Hydrotalcite DHT-4A (trade name) produced by Kyowa Kagaku Co. (hereinafter referred to "DHT-4A").
② Calcium stearate (a commercially available reagent, hereinafter referred to as "S-Ca").
③ Zinc stearate (a commercially available reagent, hereinafter referred to as "S-Zn").
Impact strength improver
Hydrogenated styrene-butadiene block copolymer, KRATON G-1651 Grade (trade name) produced by Shell Chemical Co. (hereinafter referred to as "SEBS").

According to the composition ratios shown in Table 12, the respective components were sufficiently mixed by a super mixer and the mixtures were kneaded by using a biaxial extruder TEX-44 (trade name) with vents manufactured by Nippon Seikosho Co. under conditions of a setting temperature of 210° C., a screw rotary number of 250 rpm and an extrusion amount of 40 kg/hour to obtain pellets of resin compositions.

Test pieces of the resulting compositions were prepared by injection molding by using an inline screw type injection molding machine IS-90B (trade name) manufactured by Toshiba Kikai Seisakusho Co. at a cylinder temperature of 260° C. and a mold-cooling temperature of 80° C., and physical properties thereof were evaluated. The results are shown in Table 12.

Physical properties were evaluated according to the methods described below.

Impact resistance and tensile strength were measured in the same manner as in Examples 13 and 14.

TABLE 12

| Composition (parts) | Example | | | | | | |
|---|---|---|---|---|---|---|---|
|  | 43 | 44 | 45 | 46 | 47 | 48 | 49 |
| Component (A) PPE | 30 | 30 | 30 | 30 | 30 | 30 | 30 |
| Component (B) PBT | 70 | 70 | 70 | 70 | 70 | 70 | 70 |
| SEBS | 15 | 15 | 15 | 15 | 15 | 15 | 15 |
| Component (C) PEP36 | 1 | 1 | 1 | 1 | — | 1 | — |
| Component (C) PEP24 | — | — | — | — | 1 | — | 1 |
| Component (D) DHT-4A | 0.2 | — | — | 0.1 | 0.2 | — | — |
| Component (D) S-Ca | — | 0.2 | — | — | — | — | — |
| Component (D) S-Zn | — | 0.2 | — | — | — | — | — |
| Evaluation results | | | | | | | |
| Izod impact strength (kg · cm/cm$^2$) | 57.2 | 58.3 | 61.8 | 55.0 | 54.7 | 46.2 | 42.8 |
| Tensile break strength (kg/cm$^2$) | 388 | 391 | 386 | 384 | 387 | 375 | 372 |
| Tensile break elongation (%) | 74 | 68 | 43 | 48 | 61 | 23 | 31 |

Examples 50 and 51;

According to the composition ratios shown in Table 13, the respective components were sufficiently mixed by a super mixer and the mixtures were kneaded by using a biaxial extruder TEX-44 (trade name) manufactured by Nippon Seikosho Co. under conditions of a setting temperature of 230° C., a screw rotary number of 200 rpm and an extrusion amount of 30 kg/hour to obtain three kinds of pellets. These pellets were called MB-1 and MB-2, respectively.

TABLE 13

|  | Pellet | |
|---|---|---|
| Composition (parts) | MB-1 | MB-2 |
| Component (A) PPE | 5 | 5 |
| SEBS | 15 | 15 |
| Component (D) DHT-4A | 0.2 | — |
| Component (D) S-Ca | — | 0.2 |

According to the composition ratios shown in Table 14, the above pellets were kneaded and evaluated in the same manner as in Example 34 except for changing the screw rotary number to 150 rpm. The results are shown in Table 14.

TABLE 14

| Composition (parts) | Example 50 | Example 51 |
|---|---|---|
| Component (A) PPE | 25 | 25 |
| Component (B) PBT | 70 | 70 |
| MB-1 ((A)+SEBS+(D)) | 20.2 | — |
| MB-2 ((A)+SEBS+(D)) | — | 20.2 |
| Component (C) PEP-36 | 1 | 1 |
| Evaluation results | | |
| Izod impact strength (kg · cm/cm$^2$) | 77.6 | 59.2 |
| Tensile break strength (kg/cm$^2$) | 414 | 407 |
| Tensile break elongation (%) | 165 | 126 |

Examples 52 to 55

The following respective components were used.

(A) PPE

Two kinds of poly(2,6-dimethyl-1,4-phenylene ether) produced by Nippon Polyether Co. having an intrinsic viscosity measured at 30° C. in chloroform of 0.30 dl/g (hereinafter referred to as "H-30") and having that of 0.41 dl/g (hereinafter referred to as "H-41").

<PPE having an alcoholic hydroxyl group>

Five kinds of PPE having an alcoholic hydroxyl group were prepared by the methods described in the following Reference examples 1 to 5.

Reference example 1

In 5 liter of toluene was dissolved the above H-41 (PPE) under nitrogen atmosphere at 80° C. To the solution was added 500 ml of an ethanol solution in which 50 g of sodium ethoxide had been previously dissolved, and then 150 g of glycidol was added dropwise thereto. After the mixture was stirred at 10° C. for 5 hours, the reaction mixture was poured into 25 liter of methanol to precipitate PPE having an alcoholic hydroxyl group which was a reaction product. The reaction product was collected by filtration, washed with methanol and water and dried under reduced pressure at 80° C.

This PPE having an alcoholic hydroxyl group had a peak derived from a hydroxyl group at around 3380 cm$^{-1}$ of its infrared absorption spectrum. Phenolic hydroxyl groups at a molecular end of this PPE were quantitated to find that 59% of them were reacted.

Reactivity of phenolic hydroxyl groups at a molecular end of this PPE was calculated by quantitating phenolic hydroxyl groups before and after the reaction according to the method described in "Journal of Applied Polymer Science: Applied Polymer Symposium, vol. 34 (1978), pp. 103 to 117.

This PPE having an alcoholic hydroxyl group was called Modified PPE A.

Reference example 2

Procedures were carried out in the same manner as in Reference example 1 except for using 75 g of sodium ethoxide and 250 g of glycidol.

The reactivity of phenolic hydroxyl groups at a molecular end of PPE was 74%.

This PPE having an alcoholic hydroxyl group was called Modified PPE B.

Reference example 3

Under nitrogen gas atmosphere, 75 parts of 2-allyl-6-methylphenol was dissolved in 400 parts of anhydrous tetrahydrofuran, and 503 parts of a tetrahydrofuran solution containing boran at a concentration of 1 mole/liter was added dropwise thereto at 5° C. The mixture was reacted at 29° C. for 1 hour. 30 parts of pure water was added to the reaction mixture, and further 300 parts of a 10% sodium hydroxide aqueous solution was added thereto. After 51 parts of a 30% hydrogen peroxide solution was added dropwise to the mixture at 40° C., the mixture was reacted at 50° C. for 1 hour.

The reaction mixture was neutralized with conc. hydrochloric acid, extracted with diethyl ether and then dehydrated with anhydrous sodium sulfate. Diethyl ether was removed, and the residue was evaporated under reduced pressure at 135° C. and 1 to 2 mmHg to obtain a desired mixture of 2-(3-hydroxypropyl)-6-methylphenol and 2-(2-hydroxypropyl)-6-methylphenol at a molar ratio of 92:8. The yield was 84%.

136 parts of this phenol derivative, 886 parts of 2,6-dimethylphenol and 9.1 parts of sodium hydroxide were dissolved in 2890 parts of xylene and 766 parts of methanol. Then, to the mixture were added 20.5 parts of di-ethanolamine, 12.6 parts of dibutylamine and 0.48 parts of manganese chloride tetrahydrate dissolved in 316 parts of methanol in this order. Polymerization reaction consisted of two stages. The former stage was regarded as until the mixture was reacted by introducing an oxygen gas at a flow rate of 0.8 liter/min while maintaining a temperature of 40° C. to precipitate solids.

The latter stage was regarded as until precipitation of a polymer was stopped by introducing an oxygen gas at a flow rate of 0.8 liter/min and a nitrogen gas at a flow rate of 8 liter/min while maintaining a temperature of 30° C. The polymer was washed with hydrochloric acid and acidic methanol to deactivate the catalyst. The resulting modified PPE had a yield of 95%, a hydroxyl group content of 7.1 mole % and a number average molecular weight of 9900.

The hydroxyl group content was shown by a ratio of the number of alcoholic hydroxyl groups to the number of polymer units and measured by $^1$H-NMR. The number average molecular weight was a value calculated on polystyrene standard measured by gel permeation chromatography (GPC).

This PPE having an alcoholic hydroxyl group was called Modified PPE C.

Reference example 4

Procedures were carried out in the same manner as in Reference example 3 except for using 82 parts of the phenol derivative obtained in Reference example 3 and 940 parts of 2,6-dimethylphenol. The resulting modified PPE had a yield of 93%, a hydroxyl group content of 4.5 mole % and a number average molecular weight of 10500.

This PPE having an alcoholic hydroxyl group was called Modified PPE D.

Reference example 5

To 3 kg of the above H-30 (PPE) was added 30 g of 2-hydroxyethyl methacrylate, and the mixture was stirred sufficiently. The mixture was melted and kneaded at 240° to 280° C. by a biaxial extruder to be pelletized. This PPE having an alcoholic hydroxyl group was called Modified PPE E.

<PPE having an epoxy group>

PPE having an epoxy group was prepared by the method described in the following Reference example 6.

Reference example 6

Procedures were carried out in the same manner as in Reference example 1 except for using 60 g of N-[4-(2,3-epoxypropoxy)-3,5-dimethylbenzyl]acrylamide in place of 2-hydroxyethyl methacrylate.

This PPE having an epoxy group was called Modified PPE F.

<PPE having acid an anhydride group>

PPE having an acid anhydride group was prepared by the method described in the following Reference example 7.

Reference example 7

Procedures were carried out in the same manner as in Reference example 1 except for using maleic anhydride in place of 2-hydroxyethyl methacrylate.

This PPE having an acid anhydride group was called Modified PPE G.

(B) Saturated polyester

Polybutylene terephthalate: Novadol 5010 Grade (trade name) produced by Mitsubishi Kasei Corporation having a number average molecular weight of 30,000 and a weight average molecular weight of 99,000 both of which were calculated on polystyrene measured by GPC (hereinafter referred to as "PBT").

(C) Organic phosphorous acid compound

Organic phosphorous acid compounds shown in the following ① to ④ were used.

① Bis(2,6-di-tert-butyl-4-methylphenyl)pentaerythritol diphosphite: MARK PEP-36 (trade name) produced by Asahi Denka Co. (hereinafter referred to as "a").

② Triphenyl phosphite: a commercially available product (hereinafter referred to as "b").

③ Distearylpentaerythritol diphosphite: MARK PEP-8 (trade name) produced by Asahi Denka Co. (hereinafter referred to as "C").

④ Bis(2,4-di-tert-butylphenyl)pentaerythritol diphosphite: MARK PEP-24G (trade name) produced by Asahi Denka Co. (hereinafter referred to as "d").

Examples 52 to 62 and Comparative examples 19 to 30

According to the composition ratios shown in Tables 15, 16, 17 and 18, the respective components were kneaded at a setting temperature of 250° C. with a rotary number of 180 rpm for 10 minutes by using a Laboplasto mill extruder (trade name) manufactured by Toyo Seiki Seisakusho Co., and the mixtures were pulverized to obtain granular resin compositions.

Characteristics of the resulting compositions were measured and evaluated by measuring test pieces obtained by injection molding at a temperature of 280° C. by using a CS183MMX Minimax injection molding machine (trade name) manufactured by Custom Scientific Co., according to the same methods as in Examples 1 to 6. The results are shown in Tables 15, 16, 17 and 18, respectively.

When kneading or molding was carried out, PBT and the compositions which had been previously dried under reduced pressure at 120° C. for 5 hours were used.

TABLE 15

| Composition (part) | Example 52 | Comparative example 19 | Comparative example 20 | Example 53 | Comparative example 21 | Example 54 | Example 55 | Comparative example 22 |
|---|---|---|---|---|---|---|---|---|
| Component (A) Modified PPE A | 40 | 40 | 40 | 40 | 40 | 10 | 10 | 10 |
| Component (A) H-41 | — | — | — | — | — | 30 | 30 | 30 |
| Component (B) PBT | 60 | 60 | 60 | 60 | 60 | 60 | 60 | 60 |
| Component (C) a | 1 | — | — | — | — | 1 | 0.5 | — |
| Component (C) b | — | 1 | — | — | — | — | — | — |
| Component (C) c | — | — | 1.2 | — | — | — | — | — |
| Component (C) d | — | — | — | 1 | — | — | — | — |
| Evaluation results | | | | | | | | |
| Izod impact strength (kg · cm/cm$^2$) | | | | | | | | |
| with notch | 58.7 | 41.2 | 35.6 | 45.5 | 28.6 | 68.4 | 64.1 | 15.0 |
| without notch | 2.3 | 1.8 | 1.8 | 1.7 | 1.4 | 3.0 | 2.0 | 1.3 |
| Tensile break strength (kg/cm$^2$) | 530 | 510 | 480 | 510 | 440 | 570 | 500 | 380 |
| Tensile break elongation (%) | 22 | 21 | 18 | 20 | 14 | 21 | 18 | 13 |

TABLE 16

| Composition (parts) | Example 56 | Comparative example 23 | Example 57 | Comparative example 24 | Example 58 | Comparative example 25 | Comparative example 26 |
|---|---|---|---|---|---|---|---|
| Component (A) Modified PPE B | 10 | 10 | — | — | — | — | — |
| Component (A) Modified PPE C | — | — | — | — | — | — | — |
| Component (A) Modified PPE D | — | — | 10 | 10 | — | — | — |
| Component (A) Modified PPE E | — | — | — | — | 40 | 40 | — |
| Component (A) 14-41 | 30 | 30 | 30 | 30 | — | — | 40 |
| Component (B) PRT | 60 | 60 | 60 | 60 | 60 | 60 | 60 |
| Component (C) a | 1 | — | 1 | — | 1 | — | — |
| Evaluation results | | | | | | | |
| Izod impact strength (kg · cm/cm$^2$) | | | | | | | |
| with notch | 52.2 | 37.3 | 35.2 | 26.4 | 20.4 | 17.1 | 11.8 |
| without notch | 2.2 | 1.5 | 2.9 | 1.3 | 1.7 | 1.4 | 0.8 |
| Tensile break strength (kg/cm$^2$) | 530 | 480 | 500 | 460 | 460 | 290 | 248 |
| Tensile break elongation (%) | 22 | 20 | 24 | 17 | 16 | 13 | 10 |

TABLE 17

| Composition (parts) | Example 59 | Comparative example 27 | Example 60 | Comparative example 28 | Example 61 | Comparative example 29 |
|---|---|---|---|---|---|---|
| Component (A) Modified PPE B | 59 | 27 | 60 | 28 | 61 | 29 |
| Component (A) Modified PPE F | 20 | 20 | 70 | 70 | — | — |
| Component (B) PBT | — | — | — | — | 40 | 40 |
| Component (C) a | 80 | 80 | 30 | 30 | 60 | 60 |
| Evaluation results | 1 | — | 1 | — | 1 | — |
| Izod impact strength (kg · cm/cm²) | | | | | | |
| with notch | 60.3 | 43.5 | 28.9 | 20.5 | 53.5 | 29.2 |
| without notch | 3.5 | 2.2 | 1.8 | 1.5 | 2.0 | 1.4 |
| Tensile break strength (kg/cm²) | 530 | 490 | 470 | 380 | 490 | 450 |
| Tensile break elongation (%) | 250 | 80 | 13 | 10 | 28 | 15 |

TABLE 18

| Composition (parts) | Example 62 | Comparative example 30 |
|---|---|---|
| Component (A) Modified PPE G | 40 | 40 |
| Component (B) PBT | 60 | 60 |
| Component (C) a | 1 | — |
| Evaluation results | | |
| Izod impact strength (kg · cm/cm²) | | |
| with notch | 18.6 | 15.2 |
| without notch | 1.3 | 1.1 |
| Tensile break strength (kg/cm²) | 310 | 260 |
| Tensile break elongation (%) | 12 | 10 |

According to the above, the resin compositions of the present invention are thermoplastic resin compositions remarkably improved in compatibility of Components (A) and (B), having both of characteristics possessed by the respective resins, having high stiffness and rigidity, and wellbalanced in mechanical strength. Further, by controlling the amount of the amino type nitrogen contained in PPE or co-existing the specific compound having a boiling point of 35° to 300° C. during the preparation thereof, more excellent resin compositions in characteristics can be obtained.

We claim:

1. A thermoplastic resin composition which comprises
   (A) 10 to 90% by weight of a polyphenylene ether,
   (B) 90 to 10% by weight of a saturated polyester, and
   (C) 0.1 to 10 parts by weight of an organic phosphorous acid compound represented by the formula:

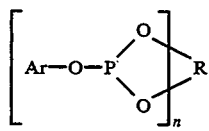

(I)

wherein n represents 1 or 2; Ar represents an aryl group having 6 to 30 carbon atoms or a substituted aryl group and when n is 2, Ars may be the same or different; and R represents an alkylene group having 2 to 18 carbon atoms or arylene group when n is 1 and represents an alkanetetrayl group having 4 to 18 carbon atoms when n is 2, based on 100 parts by weight of Components (A) and (B).

2. The composition according to claim 1, wherein said composition comprises
   (A) 10 to 90% by weight of the polyphenylene ether,
   (B) 90 to 10% by weight of the saturated polyester, and
   (C) 0.1 to 5 parts by weight of the organic phosphorous acid compound based on 100 parts by weight of Components (A) and (B).

3. The composition according to claim 1, wherein said composition comprises
   (A) 20 to 80% by weight of the polyphenylene ether,
   (B) 80 to 20% by weight of the saturated polyester, and
   (C) 0.1 to 4 parts by weight of the organic phosphorous acid compound based on 100 parts by weight of Components (A) and (B).

4. The composition according to claim 1, wherein Component (C) is selected from the group consisting of bis(nonylphenyl) pentaerythritol diphosphite, bis(2,4-di-tert-butylphenyl)pentaerythritol diphosphite and bis(2,6-di-tert-butyl-4-methylphenyl)pentaerythritol diphosphite.

5. A process for preparing the composition according to claim 1, which comprises melting and kneading Components (A), (B) and (C) and not removing partially reacted phosphite by-products and/or unreacted phosphite compounds derived from Component (C).

6. The process according to claim 5, wherein Component (C) is selected from the group consisting of bis(-nonylphenyl)pentaerythritol diphosphite, bis(2,4-di-tert-butyl-phenyl)pentaerythritol diphosphite and bis(2,6-di-tert-butyl-4-methylphenyl)pentaerythritol diphosphite.

7. The process according to claim 5, wherein the steps of melting and kneading Components (A), (B) and (C) are carried out at 760 mmHg or less.

8. The process according to claim 5, wherein the steps of melting and kneading Components (A), (B) and (C) are carried out at 600 mmHg or less.

* * * * *